United States Patent
Wilson

[11] Patent Number: 5,865,420
[45] Date of Patent: Feb. 2, 1999

[54] FLUSH VALVE REFILL RING

[75] Inventor: John R. Wilson, Naperville, Ill.

[73] Assignee: Sloan Valve Company, Franklin Park, Ill.

[21] Appl. No.: 949,513

[22] Filed: Oct. 14, 1997

[51] Int. Cl.$^6$ ........................ F16K 31/385; F16K 31/145
[52] U.S. Cl. ................. 251/40; 138/40; 251/120
[58] Field of Search ............ 138/40, 41; 251/38, 251/40, 45, 46, 118, 120, 121

[56] References Cited

U.S. PATENT DOCUMENTS

| | | |
|---|---|---|
| 5,150,877 | 9/1992 | Whiteside et al. .......................... 251/40 |
| 5,332,192 | 7/1994 | Whiteside ................................... 251/40 |
| 5,335,694 | 8/1994 | Whiteside ................................... 251/38 |

Primary Examiner—George L. Walton
Attorney, Agent, or Firm—Dorn, McEachran, Jambor & Keating

[57] ABSTRACT

A flush valve has a body with an inlet and an outlet and a passage connected therebetween. There is a valve seat at one end of the passage and a valve assembly is positioned to close upon the valve seat. The valve assembly includes a diaphragm positioned to control the flow of water through the passage, a guide member attached to the underside of the diaphragm and positioned within the passage, and a refill ring attached to the exterior of the guide member. The refill ring has a discontinuous outer wall which includes a plurality of spaced wall segments extending toward the flush valve passage and providing yielding frictional resistance to movement of the valve assembly relative to the passage to thereby dampen vibrations of the valve assembly during closing portions of the flush valve operating cycle.

12 Claims, 1 Drawing Sheet

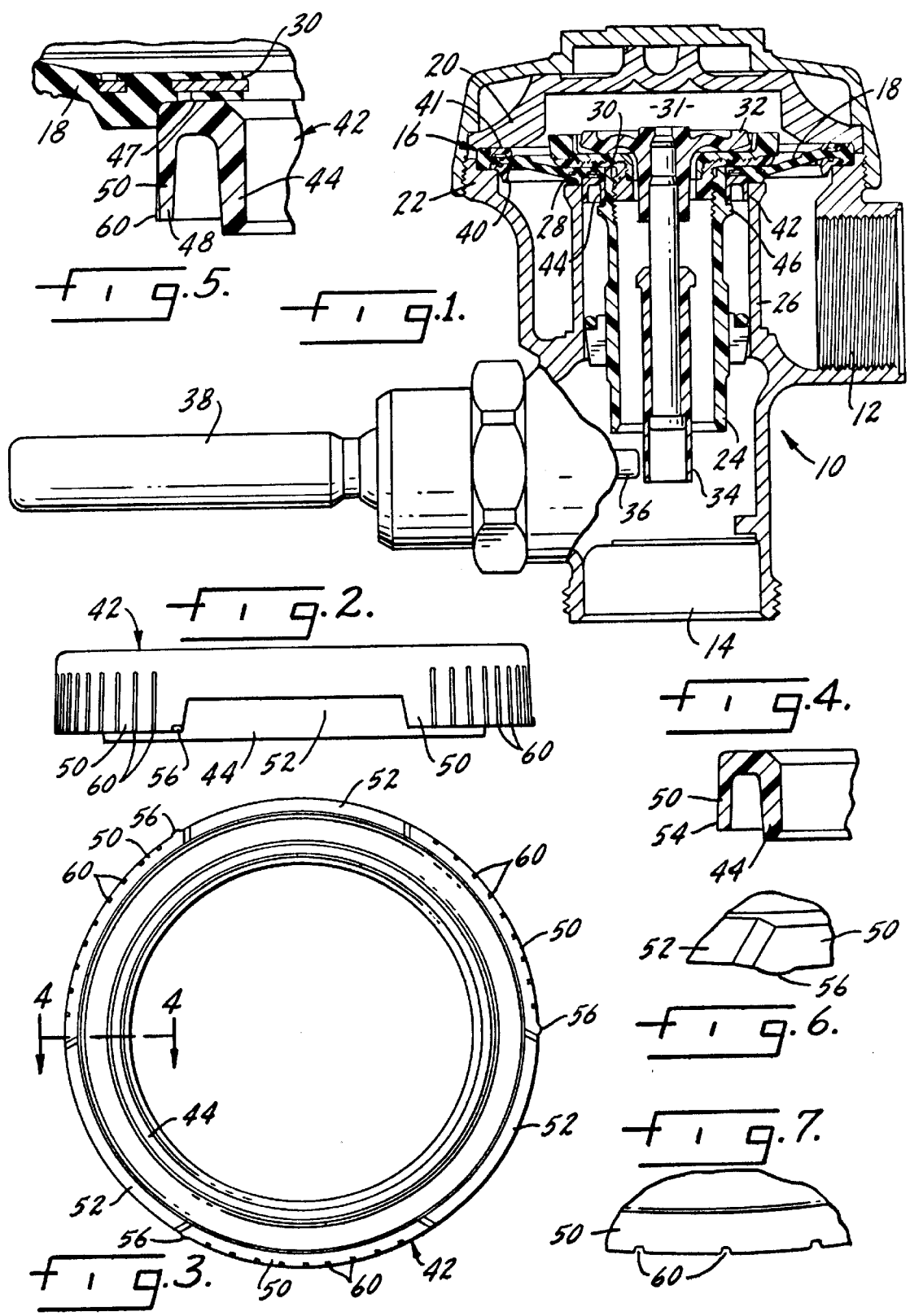

FLUSH VALVE REFILL RING

THE FIELD OF THE INVENTION

The present invention relates to flush valves of the type commonly found in public washrooms and more particularly to the refill ring. The present invention is specifically concerned with a refill ring which dampens vibration of the diaphragm valve assembly and accurately controls the volume of water passed by the flush valve during the closing portion of the flushing cycle.

THE RELATED PRIOR ART

U.S. Pat. No. 3,656,499, owned by Sloan Valve Company, assignee of the present application, shows an early form of refill ring and one which has been in common use in flush valves for a substantial number of years. The refill ring in the '499 patent was expensive to manufacture and difficult to hold to tolerance. U.S. Pat. No. 5,013,007, also owned by Sloan Valve Company, discloses a refill ring which is designed to eliminate both vibration and noise during operation of the flush valve and water hammer at closure of the flush valve. U.S. Pat. No. 5,150,877, owned by Sloan Valve Company, discloses a refill ring which has peripheral contact with the flush valve guide or barrel to avoid vibration and noise. This ring, however, added friction to movement of the flush valve diaphragm, with the result that the valve could possibly be held open at low water pressures. Further types of refill rings for use in flush valves are shown in U.S. Pat. Nos. 5,332,192 and 5,335,694, also owned by Sloan Valve Company.

SUMMARY OF THE INVENTION

The present invention relates to flush valves of the type found in public washrooms and specifically to improvements in the refill ring which dampen vibration during the closing portions of the flush valve operating cycle.

Another purpose is a refill ring for the use described which provides yielding frictional resistance during closing movement of the flush valve diaphragm assembly to dampen vibration of the diaphragm assembly.

Another purpose is an improved refill ring for the use described which significantly improves the control of flow rate during flush valve operation.

Another purpose is a refill ring for the use described which can control the flow rate through the flush valve over the range of dimensional tolerances for the bore through which the refill ring moves.

Another purpose is to provide a refill ring of the type described in which the ring has a discontinuous or segmented outer wall which will provide consistent frictional force to refill ring movement without regard to small variations in the diameter of the passage through which the ring moves.

Another purpose is a refill ring for the use described in which there are windows between the refill ring segments, with the width of the windows controlling the gallons per minute flow rate through the flush valve and the height of the windows regulating the duration of water movement through the refill ring.

Another purpose is a refill ring as described which eliminates hoop stress, permitting the refill ring segments to bend and flex as the ring moves through the flush valve passage.

Another purpose is a refill ring as described which reduces the contact stress between the refill ring and the bore to provide consistent flush valve operating performance during product life.

Another purpose is a refill ring as described which provides for lubrication between the ring outer diameter and the flush valve passage bore.

Another purpose is a refill ring for the use described which provides hydraulic centering of the refill ring within the bore as the flush valve closes.

Other purposes will appear in the ensuing specification, drawings and claims.

BRIEF DESCRIPTION OF THE DRAWINGS

The invention is illustrated diagrammatically in the following drawings wherein:

FIG. 1 is a partial axial section through a flush valve of the type described, showing the improved refill ring of the present invention;

FIG. 2 is an enlarged side view of the refill ring;

FIG. 3 is a bottom view of the refill ring;

FIG. 4 is a section along plane 4—4 of FIG. 3;

FIG. 5 is a partial section illustrating the relationship between the refill ring and diaphragm;

FIG. 6 is an enlarged side view illustrating the corner of each ring segment; and FIG. 7 is an enlarged partial bottom view illustrating the refill ring peripheral grooves.

DESCRIPTION OF THE PREFERRED EMBODIMENT

As detailed in the above-described patents, there have in the past been numerous attempts to improve flush valve performance by focusing on the structure and design of the refill ring. The refill ring controls the flow of water through the closing portion of the flush valve operating cycle. A problem which has been consistent with previous flush valve designs and the refill rings therein is the noise caused by the abrupt change in water flow through the valve, which noise is caused at least in part by the free vibration of the diaphragm assembly. Prior attempts to solve this problem were directed to adding mass to the diaphragm assembly to dampen its vibrations. The present invention solves the problem of noise and diaphragm vibration by adding frictional force resisting refill ring movement and thus diaphragm assembly vibrations. The refill ring further provides flow windows the size and shape of which may vary, depending upon whether the flush valve is used with a water closet or with a urinal, with the windows controlling both the flow rate through the flush valve during the closing portions of its cycle and the duration of such flow.

In the drawings, a flush valve body is indicated generally at 10 and has an inlet 12 and an outlet 14. The diaphragm assembly is indicated generally at 16 and includes a flexible diaphragm 18 clamped about its periphery between an internal cover 20 and a shoulder 22 formed in the flush valve body 10. A guide member 24 is attached to the diaphragm and extends within a barrel 26 of the flush valve, the barrel forming a passage between the inlet and the outlet. At the top of the barrel there is a seat 28 upon which the diaphragm assembly closes.

The diaphragm is provided with a central opening 30 within which is positioned a relief valve 32, the lower end of which, indicated at 34, is positioned for contact by plunger 36. As is well known in the art, plunger 36 is operated by movement of handle 38. There is a pressure chamber 31 above the diaphragm which functions to hold the diaphragm upon its seat until the chamber is vented by relief valve 32. There are upper and lower exterior plastic rings 40 and 41 which provide the dual functions of filtering water and providing a bypass to the pressure chamber to fill the chamber after it has been vented. The description and function of the flush valve are more fully described in the above-identified U.S. patents of Sloan Valve Company, and these disclosures are herein incorporated by reference.

The stroke of the diaphragm, which may determine the volume of water flowing through the flush valve during operation, is fixed by the relative positions of the lower end of the relief valve, indicated at 34, and the plunger 36. Movement of the plunger, as caused by movement of handle 38, causes the relief valve to move off its seat, venting the pressure in chamber 31 above the diaphragm. The diaphragm moves up a distance which is sufficient for the lower end 34 of the relief valve to clear plunger 36. The relief valve will then return to its closed vertical position, as shown in FIG. 1, and the upward stroke of the diaphragm will be completed. The diaphragm will then start to move down toward a closed position, as shown in FIG. 1.

The stroke of the diaphragm determines the time period during which water will flow, but since the diaphragm is made of rubber, it is not desirable to unduly stretch it. For this reason, it is preferred to limit the stroke of the diaphragm, but yet be able to control flow within reasonably tight limits to meet the various government standards now in force as to the volume per flush for valve operation. It is also desirable to limit the vibration of the diaphragm during the closing portion of the flush valve operating cycle, which vibration causes unacceptable noise. In addition to reducing the level of noise during flush valve operation, the present invention specifically provides more precise control of flow through the flush valve during the closing portions of the flush valve operating cycle commonly known as the refill portion in which the toilet bowl is being partially filled with water. The refill ring of the present invention also is specifically designed to provide consistent flow during the cycle of flush valve operation even though the barrel 26 may have a small range of diameters due to the inherent tolerances in any machined part.

The refill ring is indicated at 42 and will have a generally U-shaped cross section. Preferably, it is formed from a suitable plastic. There is an inner wall 44 which is in contact with the outer surface of the guide member 24 and is held in position thereon by an inwardly-directed shoulder 46. The refill ring 42 has a discontinuous outer wall 48 which is formed into a plurality of arcuate segments 50. There is a window 52 between each segment. The depth or height of the windows 52 will determine the duration during which water flows as the refill ring moves to its fully closed position, with water flowing through the windows until such time as the diaphragm has moved to its fully closed position. The width of each window 52 will determine the flow rate during the refill portion of the flush valve operating cycle. The height and width of the windows will vary, depending upon whether the valve is to be used in a water closet or in a urinal. The refill ring 42 will be countersunk into the lower surface of the diaphragm, as at 47, to increase the length of the flexible spring-like segments 50.

The wall segments 50, in their undeflected position shown in FIG. 5, will have an outer diameter slightly greater than the inner diameter of the barrel 26, with the end result that there will be yielding frictional resistance to refill ring and thus valve assembly movement as the valve assembly moves to its fully closed position. The segments 50 will deflect inward and function as cantilever springs. The actual frictional bearing surface between the outer wall of the segments 50 and the inner wall of the barrel 26 is the area indicated at 54, with this limited area providing the necessary frictional load to dampen vibration of the diaphragm as the diaphragm assembly moves to its fully closed position. The frictional area 54 reduces the contact stress between the bore and the refill head and contributes to consistent performance during product life.

Of specific advantage to the use of the cantilever spring segments 50 is that they will accommodate bore manufacturing tolerances and will improve the accuracy of the gallons per minute flow through the flush valve during the complete cycle of flush valve operation.

At each corner of a segment 50 there is a small bead 56 which extends outwardly from the segment and which is a localized projection. The maximum deflection of each segment 50 will be at the corner. Thus, the corners will provide an additional frictional load, as they will deflect initially and will have the maximum deflection of each segment. The addition of frictional resistance added by the bead 56 provides consistent loading or resistance to refill ring movement and thus again will accommodate tolerances within the bore when the refill ring moves during opening and closing movements of the diaphragm assembly. The outer surface of each of the segments 50 has a plurality of inwardly directed axially extending grooves 60 which provide a means for creating lubrication between the refill ring outer diameter and the bore of the barrel 26 during flush valve movement. This again is directed to consistent operation of the flush valve and thus consistent performance despite the manufacturing tolerances which are present in any finished product of this type. Further, the grooves 60 will provide hydraulic centering of the refill ring within the bore as it moves to its closing position.

As detailed above, there are numerous advantages to the use of a refill ring which has a discontinuous outer wall, which wall has a plurality of flexible segments functioning as cantilever springs, with the windows between the segments controlling the profile of water flow through the flush valve during the closing portion of flush valve operation. The particular design, structure and form of the refill ring will provide consistent performance during product life, consistent loading regardless of the tolerance variations in bore diameter, and a control of flow profile through the flush valve. The size and shape of the windows between the segments may vary, depending upon whether the refill ring is to be used in a flush valve for a water closet or one for a urinal.

Whereas the preferred form of the invention has been shown and described herein, it should be realized that there may be many modifications, substitutions and alterations thereto.

The embodiments of the invention in which an exclusive property or privilege is claimed are defined as follows:

1. In a flush valve, a body having an inlet and an outlet, a passage connecting the inlet and outlet, a valve seat at one end of the passage, a valve assembly in said body including a diaphragm positioned to control the flow of water through said passage and to close upon said seat, a guide member attached to the underside of said diaphragm and positioned within said passage, a refill ring attached to the exterior of said guide member and positioned for contact with said passage, said refill ring having a discontinuous outer wall which includes a plurality of spaced wall segments extending toward said passage, said refill ring having a generally inverted U-shaped cross section with an inner wall joined to and radially spaced from said discontinuous outer wall to form a downwardly-facing annular space therebetween, said outer wall being flexible with said outer wall segments functioning as cantilever springs providing yielding frictional resistance to movement of said valve assembly relative to said passage to thereby dampen vibration of said valve assembly during the closing portion of the flush valve operating cycle.

2. The flush valve of claim 1 wherein said refill ring has an inner wall joined to and spaced from said discontinuous outer wall, said outer wall being flexible with said outer wall segments functioning as cantilever springs to provide yielding frictional resistance to valve assembly movement relative to said passage.

3. The flush valve of claim 1 wherein said discontinuous outer wall has windows between said wall segments, with the width of said windows determining flow rate through the flush valve passage as said valve assembly moves to a closing position.

4. The flush valve of claim 3 wherein the height of said windows determines the duration of flow through the flush valve passage as said valve assembly moves to a closing position.

5. The flush valve of claim 3 in which each wall segment at a corner adjacent a window has an outwardly extending localized projection for contact with said passage such that the wall segments will have maximum deflection at the segment corners.

6. The flush valve of claim 3 wherein said outer wall segments have a plurality of axially extending inward grooves in the outer surface thereof.

7. The flush valve of claim 1 wherein said refill ring is countersunk into the underside of said diaphragm.

8. A refill ring for use in a diaphragm-type toilet device flush valve, which flush valve has a water passage, with said refill ring moving relative to said water passage during a flush valve cycle of operation, said refill ring having a discontinuous outer wall which includes a plurality of spaced wall segments extending toward the flush valve passage, said refill ring having a generally inverted U-shaped cross section with an inner wall joined to and radially spaced from said discontinuous outer wall to form a downwardly-facing annular space therebetween, said outer wall being flexible with said outer wall segments functioning as cantilever springs providing yielding frictional resistance to movement of the refill ring relative to the passage to thereby dampen vibration of refill ring movement during the closing portion of the flush valve operating cycle.

9. The refill ring of claim 8 wherein said discontinuous outer wall has windows between said wall segments, with the width of said windows determining flow rate through the flush valve as said refill ring moves to a closing position during flush valve operation.

10. The refill ring of claim 9 wherein the height of said windows determines the duration of water flow through the refill ring as said ring moves to a closing position during the closing portion of the flush valve operating cycle.

11. The refill ring of claim 9 which each wall segment at a corner adjacent a window has an outwardly extending localized projection for contact with the passage such that the wall segments will have maximum deflection at the segment corners.

12. The refill ring of claim 10 wherein said outer wall segments have a plurality of axially extending grooves in the outer surface thereof.

* * * * *